(12) United States Patent
Kano

(10) Patent No.: US 11,380,314 B2
(45) Date of Patent: Jul. 5, 2022

(54) VOICE RECOGNIZING APPARATUS AND VOICE RECOGNIZING METHOD

(71) Applicant: SUBARU CORPORATION, Tokyo (JP)

(72) Inventor: Tatsuo Kano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 112 days.

(21) Appl. No.: 16/795,128

(22) Filed: Feb. 19, 2020

(65) Prior Publication Data
US 2020/0312316 A1    Oct. 1, 2020

(30) Foreign Application Priority Data

Mar. 25, 2019  (JP) .............................. JP2019-056886

(51) Int. Cl.
*G10L 15/22* (2006.01)
*G10L 15/20* (2006.01)
(Continued)

(52) U.S. Cl.
CPC .............. *G10L 15/20* (2013.01); *G10L 15/22* (2013.01); *G10L 15/26* (2013.01); *G10L 15/30* (2013.01);
(Continued)

(58) Field of Classification Search
CPC ................................. G10L 15/20; G10L 15/22
See application file for complete search history.

(56) References Cited

U.S. PATENT DOCUMENTS 7,826,945 B2 *  11/2010  Zhang ................ G08G 1/09675
                                                    701/36
8,438,023 B1 *   5/2013  Hamilton ................ G10L 15/22
                                                    704/233
(Continued)

FOREIGN PATENT DOCUMENTS

JP     4-62598 A      2/1992
JP     2921059 B      7/1999
(Continued)

OTHER PUBLICATIONS

Dragon, "Dragon-naturally speaking, installation and user guide", published in 2012. (Year: 2012).*

*Primary Examiner* — Jialong He
(74) *Attorney, Agent, or Firm* — Troutman Pepper Hamilton Sanders LLP

(57) ABSTRACT

A voice recognizing apparatus includes a sound input unit, a voice level calculating unit, a noise level calculating unit, a character converting unit, a reliability calculating unit, and a necessary voice level calculating unit. The sound input unit is configured to receive electrical signals as voice and noise signals converted from voice of a talker and noise in environment, respectively. The voice level calculating unit and the noise level calculating unit are configured to calculate, as voice and noise levels, levels of the voice and noise signals, respectively. The character converting unit is configured to perform conversion of a waveform of the electric signal as the voice signal into a character string. The reliability calculating unit is configured to calculate reliability of the conversion. The necessary voice level calculating unit is configured to calculate a necessary voice level on the basis of the voice and noise levels and the reliability.

18 Claims, 13 Drawing Sheets

(51) Int. Cl.
*G10L 15/30* (2013.01)
*G10L 25/84* (2013.01)
*G10L 15/26* (2006.01)

(52) U.S. Cl.
CPC ........ *G10L 25/84* (2013.01); *G10L 2015/223* (2013.01)

(56) References Cited

U.S. PATENT DOCUMENTS

| | | | |
|---|---|---|---|
| 2006/0190252 A1* | 8/2006 | Starkie | G10L 15/01 704/240 |
| 2009/0187402 A1* | 7/2009 | Scholl | G10L 15/01 704/233 |
| 2015/0032451 A1* | 1/2015 | Gunn | G10L 15/20 704/244 |
| 2015/0187350 A1* | 7/2015 | Kim | G10L 15/01 704/231 |
| 2017/0256270 A1* | 9/2017 | Singaraju | G10L 25/21 |

FOREIGN PATENT DOCUMENTS

| | | |
|---|---|---|
| JP | 3100180 B | 10/2000 |
| JP | 3354252 B | 12/2002 |
| JP | 2003-323191 A | 11/2003 |

\* cited by examiner

VOICE RECOGNIZING APPARATUS AND VOICE RECOGNIZING METHOD

CROSS-REFERENCE TO RELATED APPLICATIONS

The present application claims priority from Japanese Patent Application No. 2019-056886 filed on Mar. 25, 2019, the entire contents of which are hereby incorporated by reference.

BACKGROUND

The technology relates to a voice recognizing apparatus, a voice recognizing method, and a computer-readable recording medium.

SUMMARY

An aspect of the technology provides a voice recognizing apparatus that includes a sound input unit, a voice level calculating unit, a noise level calculating unit, a character converting unit, a reliability calculating unit, and a necessary voice level calculating unit. The sound input unit is configured to receive an electrical signal as a voice signal and an electrical signal as a noise signal. The electrical signal as the voice signal is converted from voice of a talker. The electrical signal as the noise signal is converted from noise in usage environment. The voice level calculating unit is configured to calculate, as a voice level, a level of the received voice signal of the talker. The noise level calculating unit is configured to calculate, as a noise level, a level of the received noise signal. The character converting unit is configured to perform conversion of a waveform of the electric signal as the voice signal into a character string. The reliability calculating unit is configured to calculate reliability of the conversion when the conversion of the waveform into the character string is performed. The necessary voice level calculating unit is configured to calculate a necessary voice level on the basis of the voice level, the noise level, and the reliability.

An aspect of the technology provides a voice recognizing apparatus that includes a sound input unit, a voice level calculating unit, a noise level calculating unit, a characteristic frequency calculating unit, and a necessary voice level calculating unit. The sound input unit is configured to receive an electrical signal as a voice signal and an electrical signal as a noise signal. The electrical signal as the voice signal is converted from voice of a talker. The electrical signal as the noise signal is converted from noise in usage environment. The voice level calculating unit is configured to calculate, as a voice level, a level of the received voice signal of the talker. The noise level calculating unit is configured to calculate, as a noise level, a level of the received noise signal. The characteristic frequency calculating unit is configured to calculate at least one characteristic frequency of the talker. The necessary voice level calculating unit is configured to calculate a necessary voice level on the basis of the voice level at the calculated characteristic frequency and the noise level at the calculated characteristic frequency.

An aspect of the technology provides a voice recognizing apparatus that includes a sound input unit, an utterance section calculating unit, a voice level calculating unit, a voice level representative value calculating unit, and a voice level display unit. The sound input unit is configured to receive an electrical signal as a voice signal. The electrical signal as the voice signal is converted from voice of a talker. The utterance section calculating unit is configured to calculate an utterance section of the talker. The voice level calculating unit is configured to calculate, as a voice level, a level of the voice signal received in the utterance section by the sound input unit. The voice level representative value calculating unit is configured to calculate a representative value of the voice level in the utterance section. The voice level display unit is configured to cause a display to display the voice level. The voice level display unit is configured to cause the display to continue to display a representative value of the voice level of previous utterance until next utterance is started.

An aspect of the technology provides a voice recognizing method including: receiving voice of a talker and noise in usage environment; performing conversion of the received voice of the talker into an electric signal as a voice signal and conversion of the received noise into an electrical signal as a noise signal; calculating, as a voice level, a level of the voice signal of the talker; calculating, as a noise level, a level of the noise signal; performing conversion of a waveform of the electric signal as the voice signal into a character string; calculating reliability of the conversion of the waveform into the character string when the conversion of the waveform into the character string is performed; and calculating a necessary voice level on the basis of the voice level, the noise level, and the reliability.

An aspect of the technology provides a voice recognizing method including: receiving voice of a talker and noise in usage environment; performing conversion of the received voice of the talker into an electric signal as a voice signal and conversion of the received noise into an electrical signal as a noise signal; calculating, as a voice level, a level of the voice signal of the talker; calculating, as a noise level, a level of the noise signal; calculating at least one characteristic frequency of the talker; and calculating a necessary voice level on the basis of the voice level at the calculated characteristic frequency and the noise level at the calculated characteristic frequency.

BRIEF DESCRIPTION OF THE DRAWINGS

The accompanying drawings are included to provide a further understanding of the disclosure, and are incorporated in and constitute a part of this specification. The drawings illustrate some example embodiments and, together with the specification, serve to explain the principles of the disclosure.

DETAILED DESCRIPTION

Figure 1:
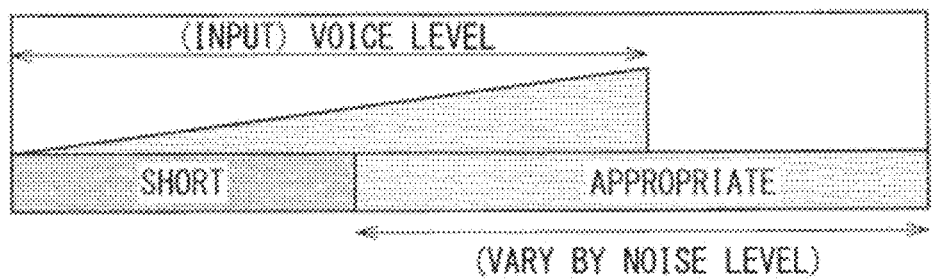
FIG. 1 is a diagram schematically illustrating one example of display of a voice level.
Figure 1:
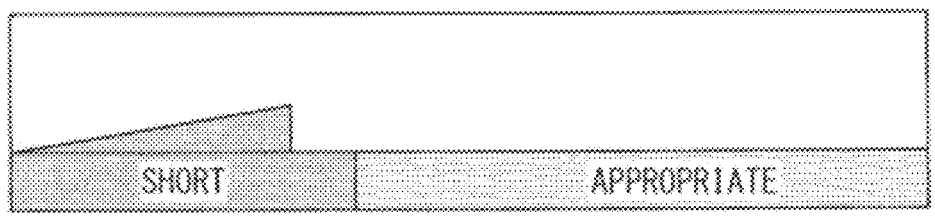

Hereinafter, some example embodiments of the technology will be described in detail with reference to the accompanying drawings. It is to be noted that throughout the present specification and the drawings, elements having substantially the same function and configuration are denoted with the same numeral to avoid any redundant description. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis.

Japanese Unexamined Patent Application Publication (JP-A) No. H04-62598 describes a voice level display system in a voice recognizing apparatus capable of causing an operator to speak a voice command with suitable volume by displaying a voice level inputted to a microphone to the operator.

However, an optimum voice level to be inputted is not determined only by a noise level of noise such as ambient noise or circuit noise, but may vary in accordance with characteristics of noise or characteristics of voice. Further, even though a voice level is displayed on a display unit, the operator cannot confirm whether the voice level is appropriate in such environment that the operator cannot turn his or her eyes toward the display unit.

It is desirable to provide a voice recognizing apparatus, a voice recognizing method, and a computer-readable recording medium that are able to recognize a suitable voice level even under various conditions.

First Example Embodiment

First, description is given of a relationship between a voice level and a noise level and a relationship between the voice level and reliability of utterance, which are presented on a display unit.

FIG. 1 is a diagram schematically illustrating one example of display of a voice level. An upper diagram of FIG. 1 illustrates that an input voice level is in a range of "appropriate". Further, a lower diagram of FIG. 1 illustrates that the input voice level is in a range of "short". A user may visually recognize the display content as illustrated in FIG. 1. This makes it possible for the user to accurately determine a level of voice in his or her utterance. In this example, the voice level may be determined by "appropriate" or "short" as a result; however, the voice level may vary continuously.

Figure 2:
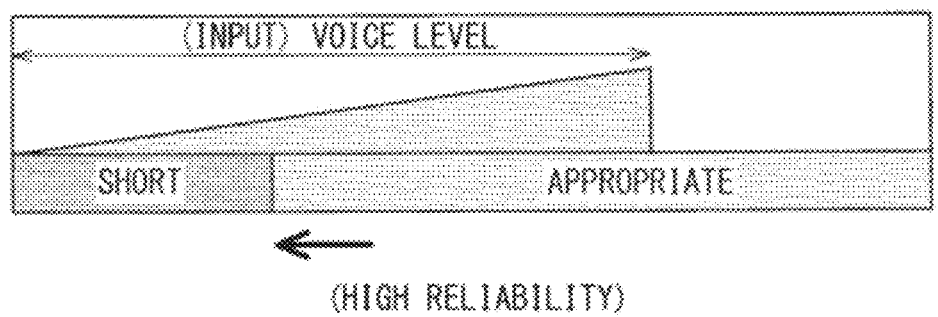
FIG. 2 is a diagram schematically illustrating another example of the display of the voice level.
Figure 2:
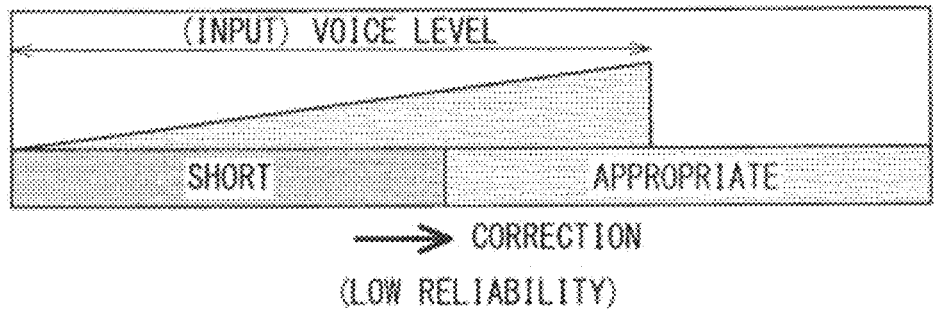

FIG. 2 is a diagram schematically illustrating another example of the display of the voice level. In the example illustrated in FIG. 2, a state where a range of each of "appropriate" and "short" of the voice level varies in accordance with reliability of utterance is illustrated. The respective diagrams in FIG. 2 illustrate cases where the reliability of the utterance is "high", "low", and "middle" from top to bottom. As illustrated in FIG. 2, the higher the reliability of the utterance is, the smaller a range that is determined as "short" of the voice level becomes. The lower the reliability of the utterance is, the larger the range that is determined as "short" of the voice level becomes. Therefore, in the example illustrated in FIG. 2, even though the voice level is the same, determination of "appropriate" or "short" may differ in accordance with the reliability.

Figure 3:
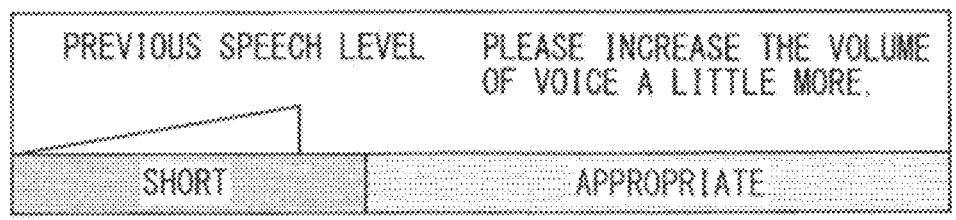
FIG. 3 is a diagram schematically illustrating one example of display of a voice level in a case where the voice level is "short".

FIG. 3 is a diagram schematically illustrating one example of display of a voice level in a case where the voice level is "short". In the example illustrated in FIG. 3, a case is illustrated where a message "please increase the volume of voice a little more" is displayed on a display unit when the voice level is "short". FIG. 3 illustrates a voice level of previous utterance. By executing such display in this manner, it is possible to cause the user, who is a talker, to recognize that the voice level is short. Further, as described above, by varying the display content in accordance with the reliability of the utterance, it is possible to cause the talker to recognize that the voice level is short more accurately.

Figure 4:
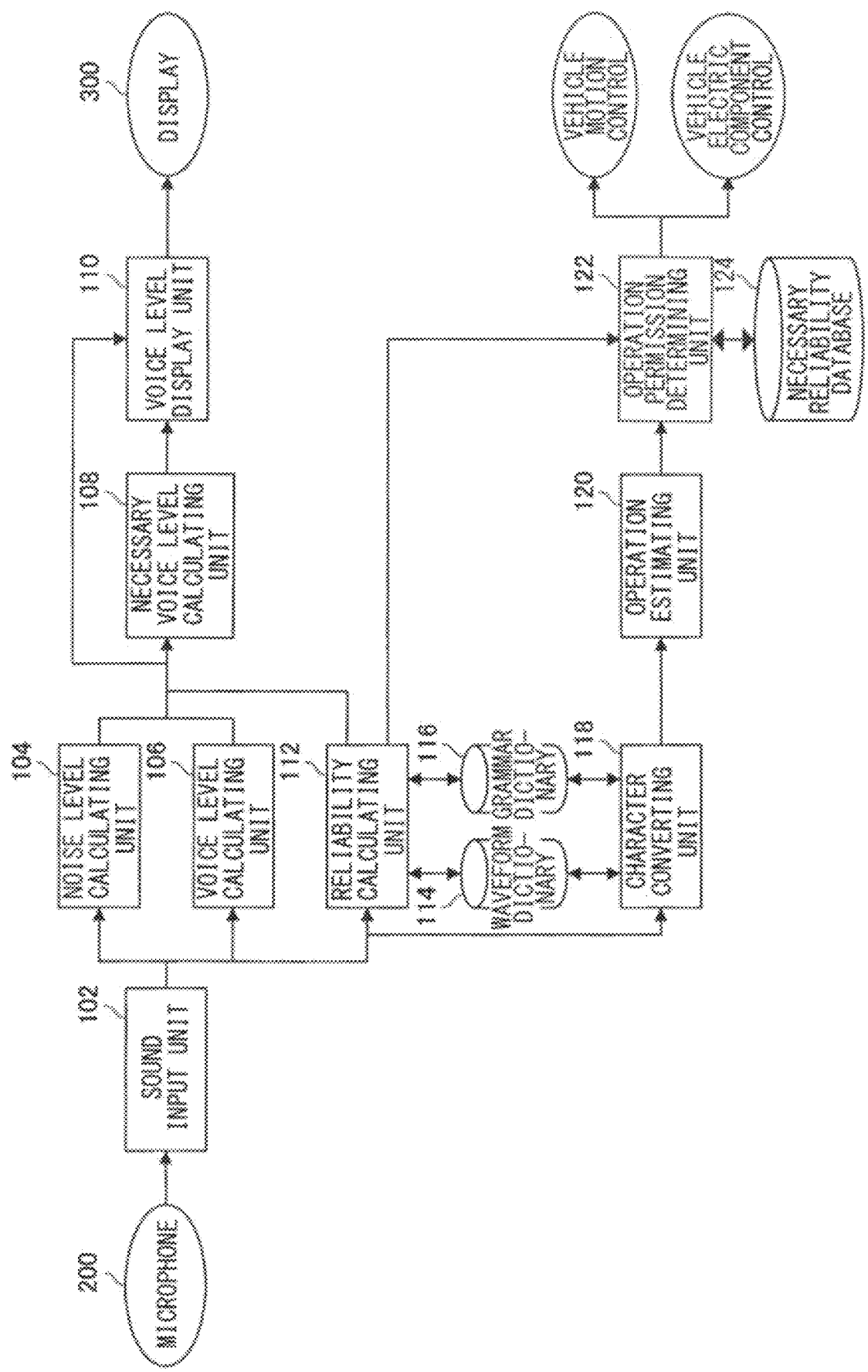
FIG. 4 is a block diagram illustrating an example of a system according to one example embodiment.

FIG. 4 is a block diagram illustrating an example of a system according to a first example embodiment. This system may be mounted on a vehicle such as an automobile. As illustrated in FIG. 4, a sound acquired by a microphone 200 may be inputted to a sound input unit 102. In other words, the sound input unit 102 receives electric signal corresponding to a sound including noise and voice (however, the voice may not be necessarily included). A noise level calculating unit 104 calculates a noise level of the acquired sound. The noise level calculating unit 104 may set, as the noise level, a volume level that is inputted when voice is not included. A voice level calculating unit 106 calculates a voice level from the acquired sound. As a specific but non-limiting example, the voice level calculating unit 106 may estimate a voice level from a difference between the noise level and the total volume level inputted when the voice is included. It is to be noted that distinction between voice and noise may be performed by appropriately using a method described in Japanese Patent No. 3354252, for example. It is to be noted that the noise level calculating unit 104 may determine whether voice is included on the basis of the set noise level.

A character converting unit 118 may refer to a waveform dictionary 114 and/or a grammar dictionary 116, and convert the inputted voice into a character string. A reliability calculating unit 112 calculates reliability of conversion at a time when the voice is converted into the character string. The reliability calculating unit 112 may calculate the reliability of the conversion for every utterance of the talker. It is to be noted that, as a method of estimating the content of a sentence of utterance by means of a microphone, a method described in Japanese Unexamined Patent Application Publication No. 2003-323191 can be used appropriately. The reliability calculating unit 112 may analyze the inputted voice, and calculate the reliability on the basis of correspondence with a voice input dictionary (including the waveform dictionary 114 and the grammar dictionary 116). As a method of calculating reliability, for example, a method described in Japanese Patent No. 2921059 or Japanese Patent No. 3100180 can be used appropriately. A necessary voice level calculating unit 108 calculates a necessary voice level on the basis of the noise level, the voice level, and the reliability. A voice level display unit 110 may execute a process to cause a display 300 to display a voice level as illustrated in FIG. 2.

Further, an operation estimating unit 120 may estimate an operation by voice on the basis of character information obtained by converting the voice by the character converting unit 118. In a case where the system is mounted on the vehicle, the operation by the voice may correspond to an operation for the vehicle (hereinafter, referred to also as a "vehicle operation"). Here, it is assumed a case where the talker specifies an operation by utterance to execute a control such as a vehicle motion control or a vehicle electric component control. The vehicle operations (such as that for the vehicle motion control or the vehicle electric component control), which are registered in advance may be associated with character strings. The vehicle operations may include "fully open the window", "radio volume up", and "park there", for example. An occupant may execute learning of the system by operating an operation target by oneself while speaking the operation by words. An operation permission determining unit 122 may determine whether the operation is to be permitted on the basis of the estimated operation and the reliability thereof. At this time, the operation permission determining unit 122 may determine whether the estimated operation is to be permitted on the basis of information stored in a necessary reliability database 124. In a case where it is determined that the estimated operation is to be permitted, the operation permission determining unit 122 may execute the permitted operation as an operation executing unit. The operation permission determining unit 122 may refer to the necessary reliability database 124, and acquire necessary reliability for the estimated operation. In a case where the calculated reliability exceeds the necessary reliability, the operation permission determining unit 122 may execute the estimated operation as the operation executing unit. However, in a case where the calculated reliability does not exceed the necessary reliability, the operation permission determining unit 122 may not execute the estimated operation. When the reliability is short, the system may present, via the display 300 or a speaker, information that notifies the occupant of that the operation cannot be executed because the reliability is short, or information that requests the occupant to so speak that the reliability becomes higher. For example, the necessary reliability, such as "opening or closing of a window (necessary reliability: 0.6)", "automatic parking (necessary reliability: 0.95)", and "audio operation (necessary reliability: 0.5)", may be registered in the necessary reliability database 124. When the operation is permitted, a control such as the vehicle motion control or the vehicle electric component control may be executed on the basis of the operation.

Figure 5:
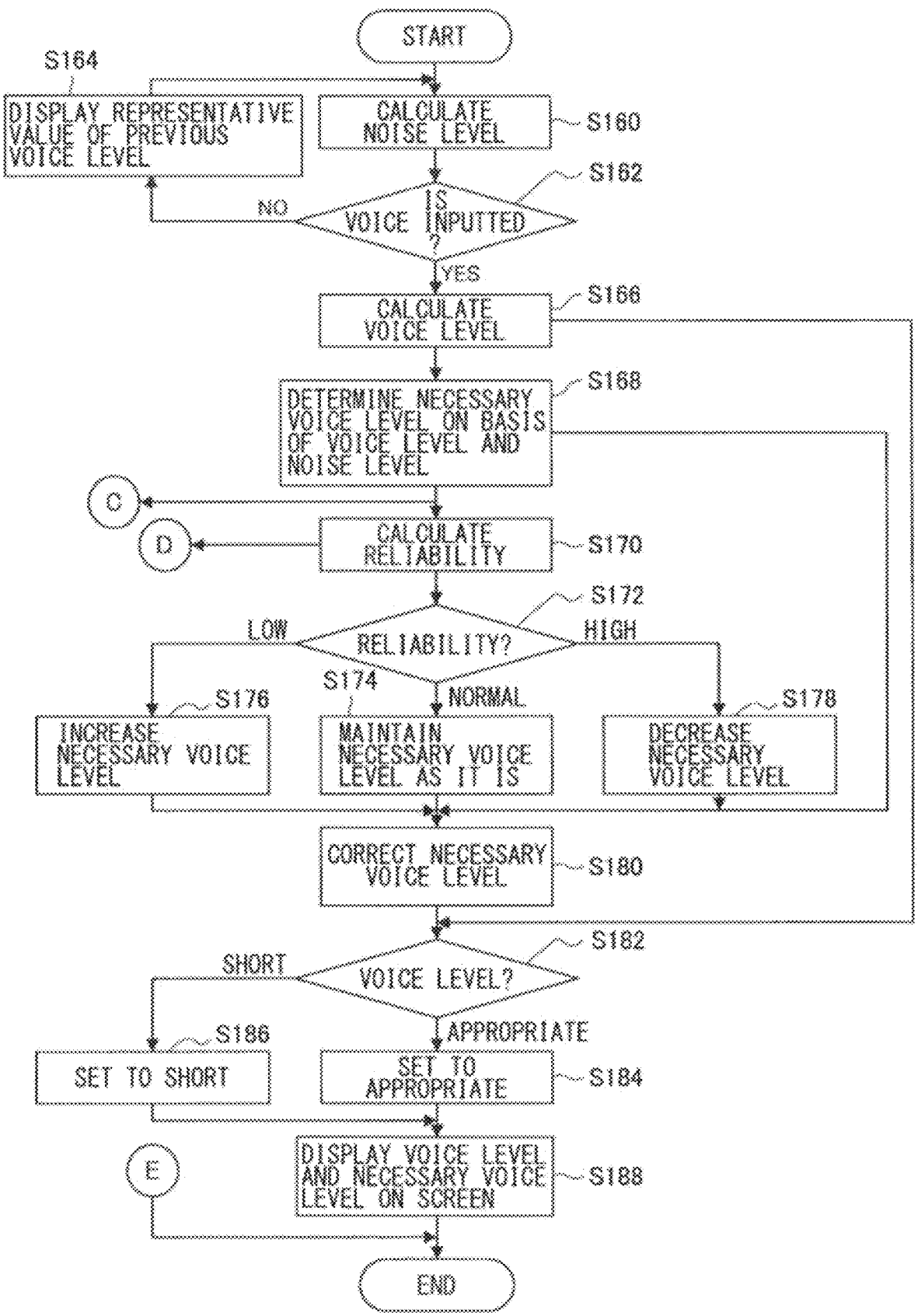
FIG. 5 is a flowchart illustrating an example of a process executed by the system illustrated in FIG. 4.

FIG. 5 is a flowchart illustrating an example of a process executed by the system illustrated in FIG. 4. In Step S160, the noise level calculating unit 104 first calculates a noise level on the basis of sound inputted from the sound input unit 102. In Step S162, the noise level calculating unit 104 or the voice level calculating unit 106 may determine whether voice is inputted on the basis of the calculated noise level. In a case where it is determined that voice is inputted (YES in Step S162), the processing flow may proceed to Step S166. In contrast, in a case where it is determined that voice is not inputted (NO in Step S162), the processing flow may proceed to Step S164. In Step S164, the voice level display unit 110 may cause the display 300 to display a representative value of a previous voice level on the screen thereof, and the processing flow may return to Step S160.

In Step S166, the voice level calculating unit 106 calculates a voice level. In Step S168, the necessary voice level calculating unit 108 determines a necessary voice level on the basis of the voice level and the noise level. It is to be noted that the necessary voice level corresponds to a boundary between "appropriate" and "short" in FIG. 2. In Step S170, the reliability calculating unit 112 calculates reliability of character conversion. In Step S172, the reliability calculating unit 112 may determine the reliability on the basis of predetermined thresholds. In a case where it is determined that the reliability is normal ("NORMAL" in Step S172), the processing flow may proceed to Step S174, and the necessary voice level calculating unit 108 may maintain the necessary voice level as it is. Further, in a case where it is determined that the reliability is low ("LOW" in Step S172), the processing flow may proceed to Step S176, and the necessary voice level calculating unit 108 may increase the necessary voice level that will be used in a process for a next or later time. Further, in a case where it is determined that the reliability is high ("HIGH" in Step S172), the processing flow may proceed to Step S178, and the necessary voice level calculating unit 108 may decrease the necessary voice level that will be used in a process for a next or later time. After any of Steps S174, S176, and S178, the processing flow may proceed to Step S180.

In Step S180, the necessary voice level calculating unit 108 may correct the necessary voice level on the basis of a result of any of Steps S174, S176, and S178. In Step S182, the necessary voice level calculating unit 108 may determine whether the voice level is appropriate on the basis of the corrected necessary voice level. In a case where it is determined that the voice level is appropriate ("APPROPRIATE" in Step S182), the processing flow may proceed to Step S184, and the voice level display unit 110 may set a color of a portion of the voice level illustrated in FIG. 2 to green. In contrast, in a case where it is determined that the voice level is short ("SHORT" in Step S182), the processing flow may proceed to Step S186, and the voice level display unit 110 may set the color of the portion of the voice level illustrated in FIG. 2 to blue. After any of Steps S184 and S186, the processing flow may proceed to Step S188, and the voice level display unit 110 may cause the display 300 to display the voice level and the necessary voice level on the screen thereof. After Step S188, the processing flow may be terminated.

Figure 6:
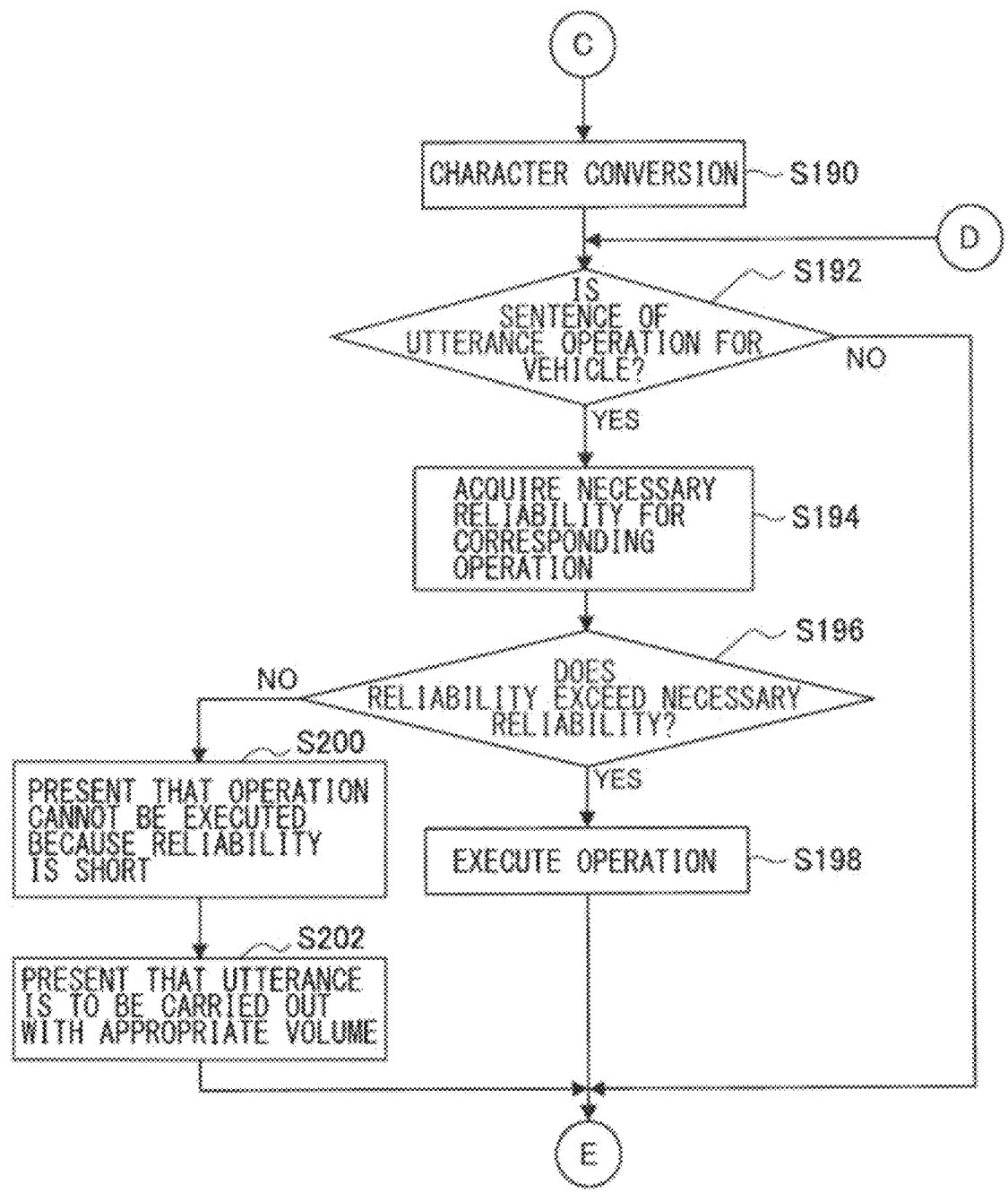
FIG. 6 is a flowchart illustrating an example of a process executed by the system illustrated in FIG. 4.

Further, after Step S168, the processing flow may proceed to Step S190 in FIG. 6. In Step S190, the character converting unit 118 may execute character conversion from inputted utterance to character string. In Step S192, the operation estimating unit 120 may estimate an operation from the character string after the conversion, and determine whether a sentence of the utterance is an operation for the vehicle. In a case where it is determined that the sentence of the utterance is the operation for the vehicle (YES in Step S192), the processing flow may proceed to Step S194. In Step S194, the operation permission determining unit 122 may acquire necessary reliability for the corresponding operation from the necessary reliability database 124. It is to be noted that the necessary reliability may be so stored in the necessary reliability database 124 as to be associated with each operation. Therefore, if a type of the operation is determined, it is possible to acquire reliability regarding the operation from the necessary reliability database 124.

In Step S196, the operation permission determining unit 122 may determine whether the reliability calculated in Step S170 exceeds the necessary reliability. In a case where it is determined that the calculated reliability exceeds the necessary reliability (YES in Step S196), the processing flow may proceed to Step S198, and the operation permission determining unit 122 may execute the operation as the operation executing unit. In contrast, in a case where it is determined in Step S196 that the calculated reliability does not exceed the necessary reliability (NO in Step S196), the processing flow may proceed to Step S200, and the operation permission determining unit 122 may present, via the display 300, that the operation cannot be executed because the reliability is short. In Step S202, the operation permission determining unit 122 may present, via the display 300, that utterance is to be carried out with appropriate volume.

Figure 7:
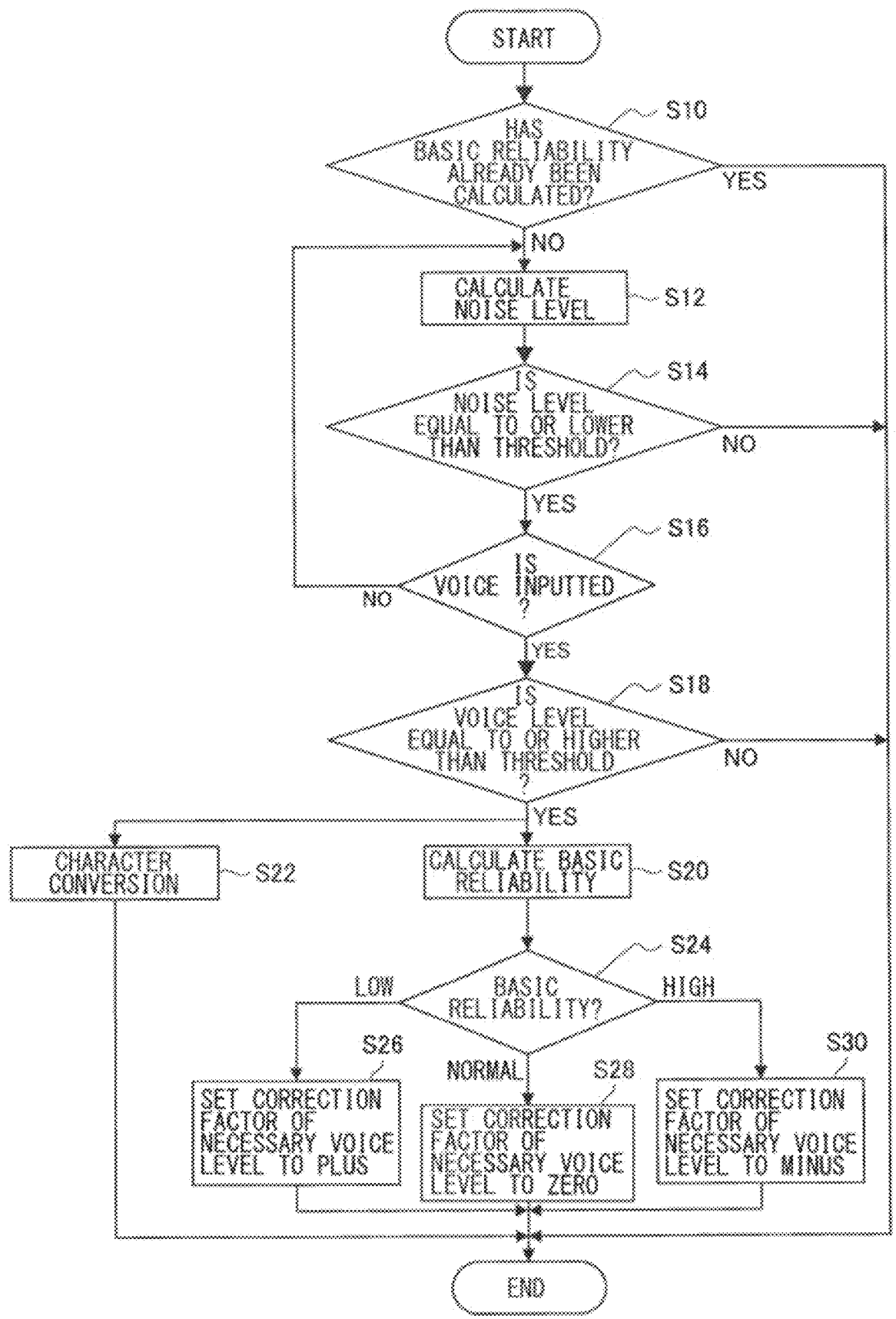
FIG. 7 is a flowchart illustrating an example of another process executed by the system illustrated in FIG. 4.

FIG. 7 is a flowchart illustrating an example of another process executed by the system illustrated in FIG. 4. First, in Step S10, the system may determine, as the reliability calculating unit 112, whether basic reliability has already been calculated, for example. In a case where it is determined that the basic reliability has not been calculated yet (NO in Step S10), the processing flow may proceed to Step S12. In Step S12, the noise level calculating unit 104 calculates a noise level. In Step S14, the noise level calculating unit 104 may determine whether the calculated noise level is equal to or lower than a threshold. In a case where it is determined that the noise level is equal to or lower than the threshold (YES in Step S14), the processing flow may proceed to Step S16, and the noise level calculating unit 104 or the voice level calculating unit 106 may determine whether voice is inputted. In contrast, in a case where it is determined that the noise level exceeds the threshold (NO in Step S14), the processing flow may be terminated.

In a case where it is determined that voice is inputted in Step S16 (YES in Step S16), the processing flow may proceed to Step S18. In a case where it is determined that voice is not inputted in Step S16 (NO in Step S16), the processing flow may return to Step S12, and the processes in Steps S12 to S16 may be repeated.

In Step S18, the voice level calculating unit 106 may determine whether a voice level is equal to or higher than a threshold. In a case where it is determined that the voice level is equal to or higher than the threshold (YES in Step S18), the processing flow may proceed to Step S20, and the reliability calculating unit 112 may calculate basic reliability. After Step S20, the processing flow may proceed to Step S24, and the reliability calculating unit 112 may determine whether the calculated basic reliability is any of normal, high, and low. In a case where it is determined that the basic reliability is low in Step S24 ("LOW" in Step S24), the processing flow may proceed to Step S26, and the necessary voice level calculating unit 108 may set a correction factor of the necessary voice level to a positive value (that is, plus). Further, in a case where it is determined that the basic reliability is normal in Step S24 ("NORMAL" in Step S24), the processing flow may proceed to Step S28, and the necessary voice level calculating unit 108 may set the correction factor of the necessary voice level to zero. Further, in a case where it is determined that the basic reliability is high in Step S24 ("HIGH" in Step S24), the processing flow may proceed to Step S30, and the necessary voice level calculating unit 108 may set the correction factor of the necessary voice level to a negative value (that is, minus).

Further, in a case where it is determined that the voice level is equal to or higher than the threshold in Step S18 (YES in Step S18), the processing flow may also proceed to Step S22, and the character converting unit 118 may execute character conversion from the inputted voice to a character string.

Figure 8:
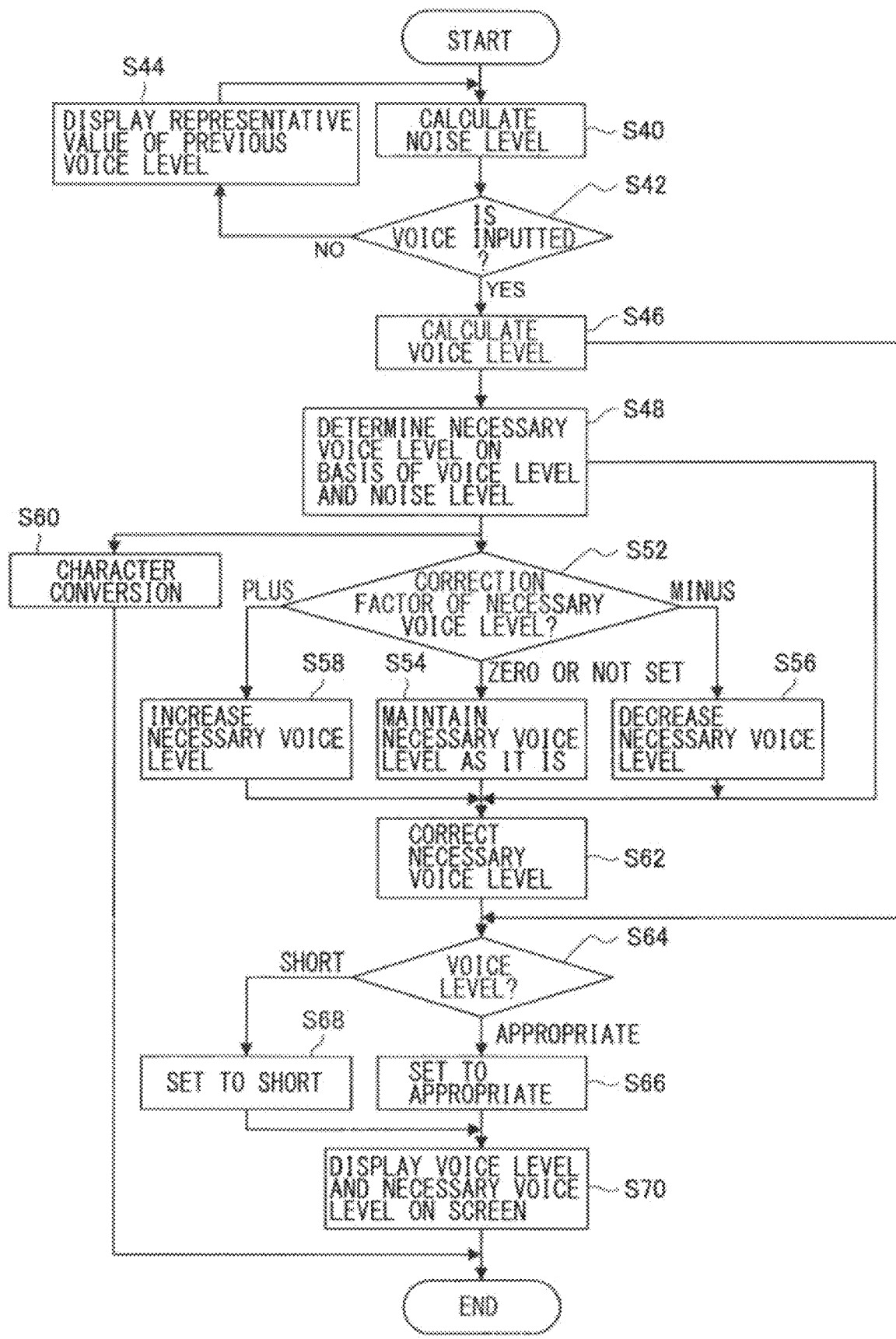
FIG. 8 is a flowchart illustrating an example of still another process executed by the system illustrated in FIG. 4.

FIG. 8 is a flowchart illustrating an example of still another process executed by the system illustrated in FIG. 4. First, in Step S40, the noise level calculating unit 104 calculates a noise level. In Step S42, the noise level calculating unit 104 or the voice level calculating unit 106 may determine whether voice is inputted. In a case where it is determined that voice is inputted (YES in Step S42), the processing flow may proceed to Step S46. In contrast, in a case where it is determined that voice is not inputted (NO in Step S42), the processing flow may proceed to Step S44, and the voice level display unit 110 may cause the display 300 to display a representative value of a previous voice level on the screen thereof, and the processing flow may return to Step S40.

In Step S46, the voice level calculating unit 106 calculates a voice level. In Step S48, the necessary voice level calculating unit 108 may determine a necessary voice level on the basis of the voice level and the noise level. In Step S52, the necessary voice level calculating unit 108 may confirm a value of the correction factor of the necessary voice level, which is set in any of Steps S26, S28, and S30. In a case where the correction factor of the necessary voice level is the positive value ("PLUS" in Step S52), the processing flow may proceed to Step S58, and the necessary voice level calculating unit 108 may increase the necessary voice level. Further, in a case where the correction factor of the necessary voice level is zero or not set ("ZERO OR NOT SET" in Step S52), the processing flow may proceed to Step S54, and the necessary voice level calculating unit 108 may maintain the necessary voice level as it is. Further, in a case where the correction factor of the necessary voice level is the negative value ("MINUS" in Step S52), the processing flow may proceed to Step S56, and the necessary voice level calculating unit 108 may decrease the necessary voice level.

After any of Steps S54, S56, and S58, the processing flow may proceed to Step S62. In Step S62, the necessary voice level calculating unit 108 may correct the necessary voice level. In Step S64, the necessary voice level calculating unit 108 may determine whether the voice level is appropriate. In a case where it is determined that the voice level is appropriate ("APPROPRIATE" in Step S64), the processing flow may proceed to Step S66. In Step S66, the voice level display unit 110 may set the color of the portion of the voice level illustrated in FIG. 2 to green. In contrast, in a case where it is determined that the voice level is short ("SHORT" in Step S64), the processing flow may proceed to Step S68, and the voice level display unit 110 may set the color of the portion of the voice level illustrated in FIG. 2 to blue.

After any of Steps S66 and S68, the processing flow may proceed to Step S70. In Step S70, the voice level display unit 110 may cause the display 300 to display the voice level and the necessary voice level on the screen thereof. After Step S70, the processing flow may be terminated.

Further, when the processing flow proceeds from Step S48 to Step S60, in Step S60, the character converting unit 118 may execute character conversion from the inputted voice to a character string. After Step S60, the processing flow may be terminated.

According to the processes illustrated in FIG. 7 and FIG. 8, in a case where it is determined that the noise level is equal to or lower than the threshold, the basic reliability based on the utterance of a specific talker may be calculated, and the correction factor of the necessary voice level may be defined in accordance with the basic reliability. Therefore, it is possible to define the necessary voice level more accurately.

Second Example Embodiment

Figure 9:
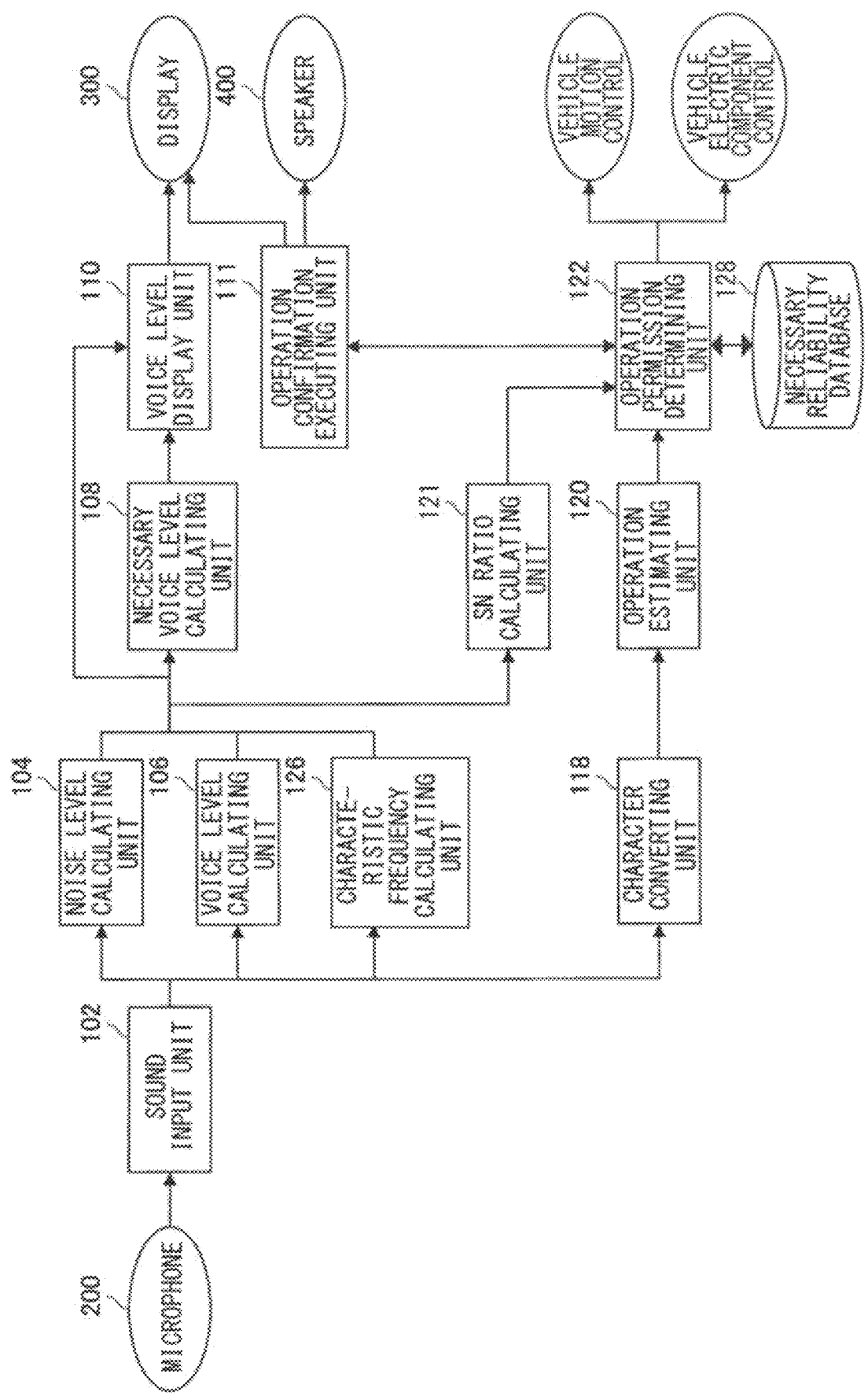
FIG. 9 is a block diagram illustrating an example of a system according to one example embodiment.

FIG. 9 is a block diagram illustrating an example of a system according to a second example embodiment. As illustrated in FIG. 9, a sound acquired by the microphone 200 may be inputted to the sound input unit 102. The noise level calculating unit 104 calculates a noise level of the acquired sound. The voice level calculating unit 106 calculates a level of voice from the acquired sound. A characteristic frequency calculating unit 126 calculates a characteristic frequency. The characteristic frequency calculating unit 126 calculates at least one characteristic frequency of a talker. The characteristic frequency calculating unit 126 may define a frequency band with the largest amplitude in the voice as the characteristic frequency, for example. Determination as to whether a voice level is adequate by an SN ratio between noise and voice may be made only in this frequency band.

The necessary voice level calculating unit 108 calculates a necessary voice level on the basis of the noise level, the voice level, and the characteristic frequency. The voice level display unit 110 may execute a process to cause the display 300 to display the voice level on a screen thereof.

An SN ratio calculating unit 121 may calculate the SN ratio between the noise and the voice on the basis of the noise level and the voice level.

The character converting unit 118 may refer to an unillustrated waveform dictionary and an unillustrated grammar dictionary, and convert the inputted voice into a character string. The operation estimating unit 120 may estimate an operation based on the voice on the basis of character information obtained by conversion by the character converting unit 118. The operation permission determining unit 122 may determine whether the estimated operation is to be permitted on the basis of the estimated operation and the SN ratio. In a case where it is determined that the estimated operation is to be permitted, the operation permission determining unit 122 may execute the permitted operation as an operation executing unit. At this time, the operation permission determining unit 122 may determine whether the operation is to be permitted on the basis of information stored in a necessary SN ratio database 128. In a specific but non-limiting example, the operation permission determining unit 122 may compare the SN ratio between the noise and the voice calculated by the SN ratio calculating unit 121 with a necessary SN ratio at the characteristic frequency stored in the necessary SN ratio database 128, and determine whether the operation is to be permitted on the basis of a comparison result. In a case where it is determined that the operation is to be permitted, a control such as a vehicle motion control or a vehicle electric component control may be executed on the basis of the operation.

Figure 10:
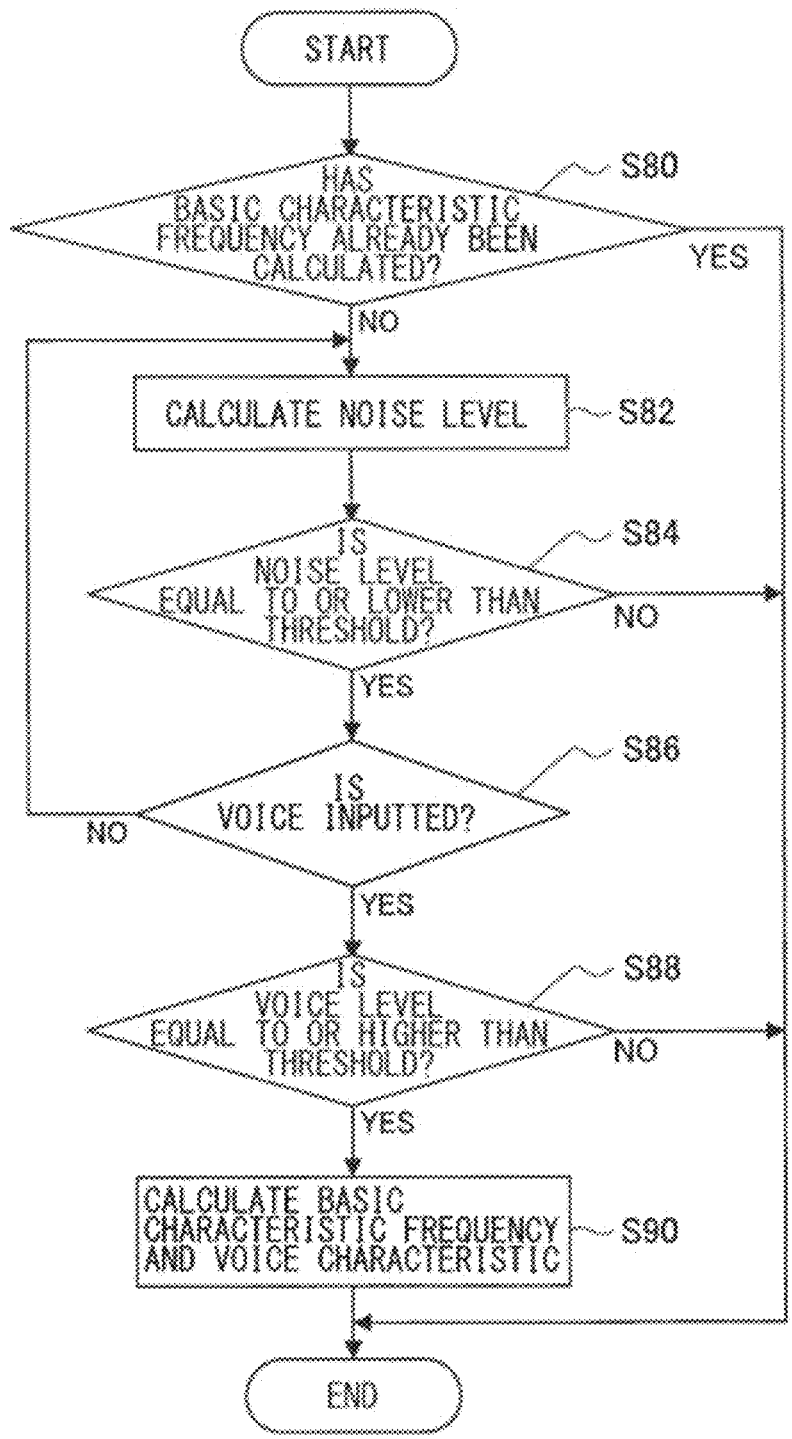
FIG. 10 is a flowchart illustrating an example of a process executed by the system illustrated in FIG. 9.

FIG. 10 is a flowchart illustrating an example of a process executed by the system illustrated in FIG. 9. First, in Step S80, the characteristic frequency calculating unit 126 may determine whether at least one basic characteristic frequency of a talker has already been calculated. In a case where it is determined that any basic characteristic frequency has not been calculated yet (NO in Step S80), the processing flow may proceed to Step S82. In Step S82, the noise level calculating unit 104 calculates a noise level. In Step S84, the noise level calculating unit 104 may determine whether the noise level is equal to or lower than a threshold. In a case where it is determined that the noise level is equal to or lower than the threshold (YES in Step S84), the processing flow may proceed to Step S86. In contrast, in a case where it is determined that the noise level is not equal to or lower than the threshold (NO in Step S84), the processing flow may be terminated.

In Step S86, the noise level calculating unit 104 or the voice level calculating unit 106 may determine whether voice is inputted on the basis of the calculated noise level. In a case where it is determined that the voice is inputted (YES in Step S86), the processing flow may proceed to Step S88. In Step S88, the voice level calculating unit 106 may determine whether the voice level is equal to or higher than a threshold. In a case where it is determined that the voice level is equal to or higher than the threshold (YES in Step S88), the processing flow may proceed to Step S90. In Step S90, the characteristic frequency calculating unit 126 may calculate at least one basic characteristic frequency and a voice characteristic, and the processing flow may be terminated.

Thus, in the present process, in a case where it is determined that any basic characteristic frequency of the talker has not been calculated yet (NO in Step S80), the characteristic frequency calculating unit 126 may calculate at least one basic characteristic frequency of the talker in a situation that the noise level is low. Further, the noise level calculating unit 104 may calculate the noise level at the basic characteristic frequency at any time or as needed.

Figure 11:
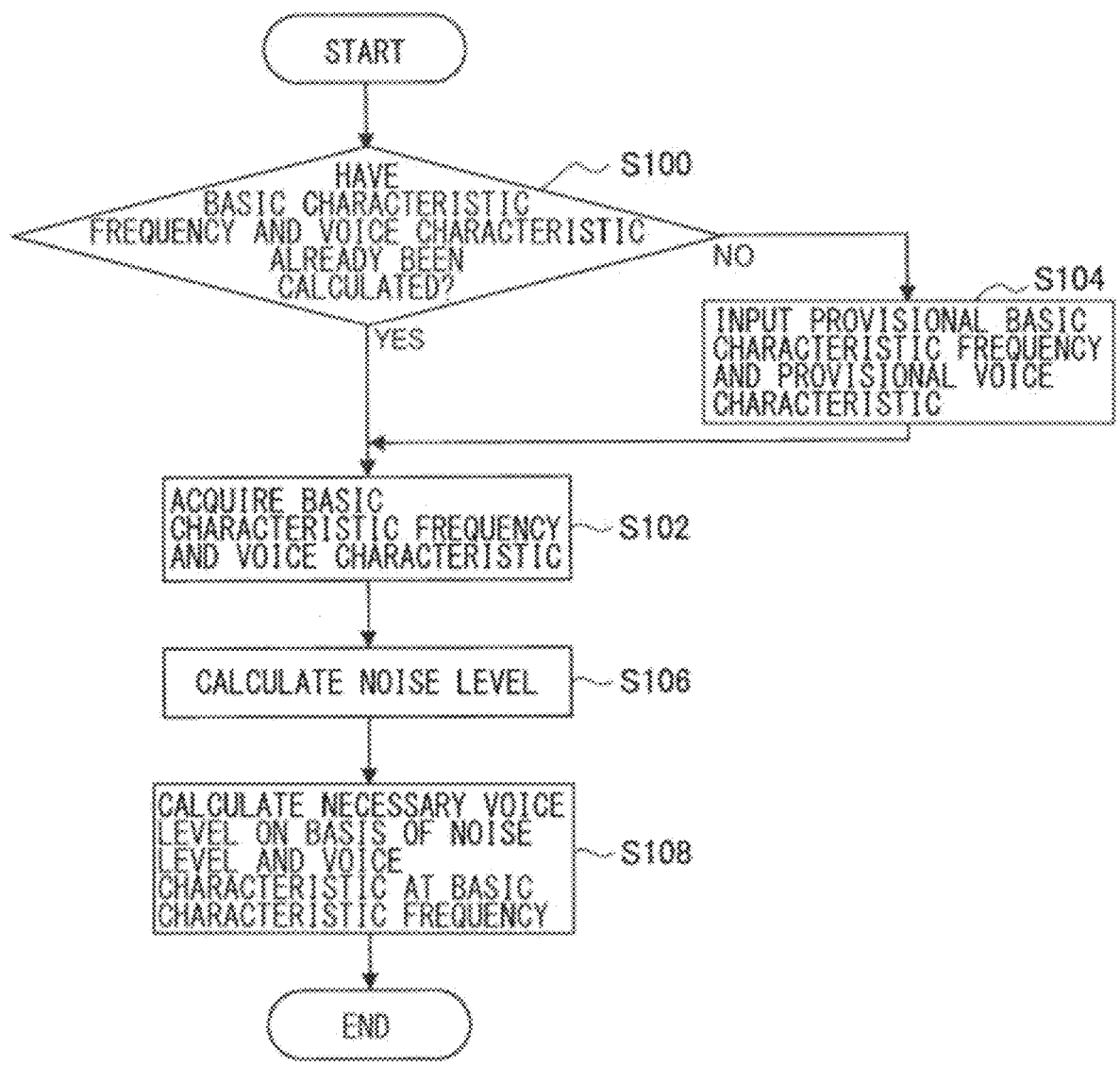
FIG. 11 is a flowchart illustrating an example of a process executed by the system illustrated in FIG. 9.

Further, FIG. 11 is a flowchart illustrating an example of a process executed by the system illustrated in FIG. 9. First, in Step S100, the characteristic frequency calculating unit 126 may determine whether the basic characteristic frequency and the voice characteristic of the talker have already been calculated. In a case where it is determined that the basic characteristic frequency and the voice characteristic have already been calculated (YES in Step S100), the processing flow may proceed to Step S102. In Step S102, the noise level calculating unit 104 may acquire the basic characteristic frequency and the voice characteristic. In contrast, in a case where it is determined that the basic characteristic frequency and the voice characteristic have not been calculated yet (NO in Step S100), the processing flow may proceed to Step S104. In Step S104, the characteristic frequency calculating unit 126 may input a provisional basic characteristic frequency and a provisional voice characteristic, and the processing flow may proceed to Step S102.

In Step S102, the noise level calculating unit 104 may acquire the basic characteristic frequency and the voice characteristic. After Step S102, the processing flow may proceed to Step S106, and the noise level calculating unit 104 may calculate a noise level on the basis of the acquired basic characteristic frequency and voice characteristic. In Step S108, the necessary voice level calculating unit 108 may calculate a necessary voice level on the basis of the noise level and the voice characteristic at the basic characteristic frequency. In this case, in the similar manner to that of the flowchart illustrated in FIG. 10, the necessary voice level calculating unit 108 may calculate the necessary voice level on the basis of the noise level calculated at the basic characteristic frequency at any time or as needed and the voice characteristic.

Figure 12:
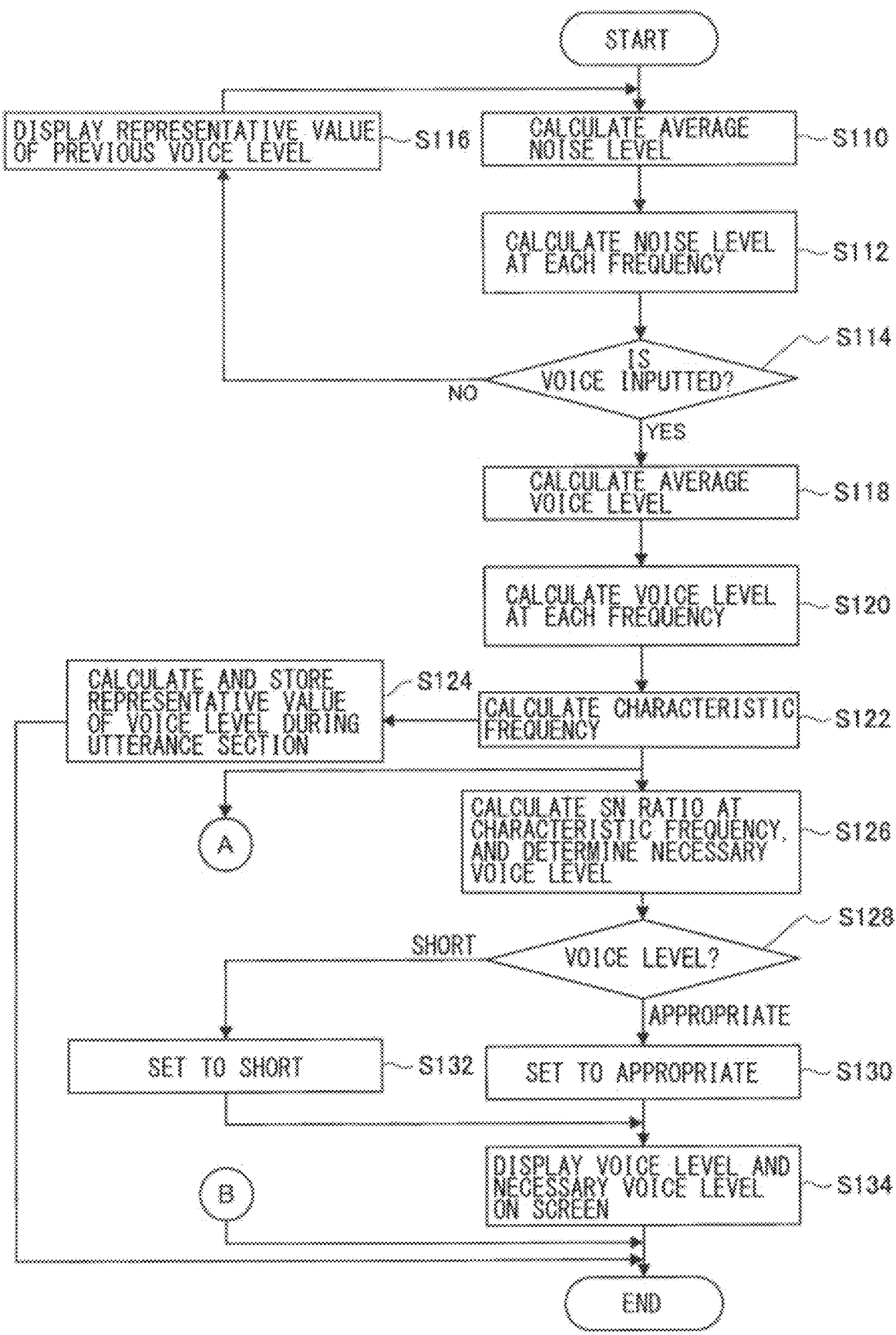
FIG. 12 is a flowchart illustrating an example of another process executed by the system illustrated in FIG. 9.
Figure 13:
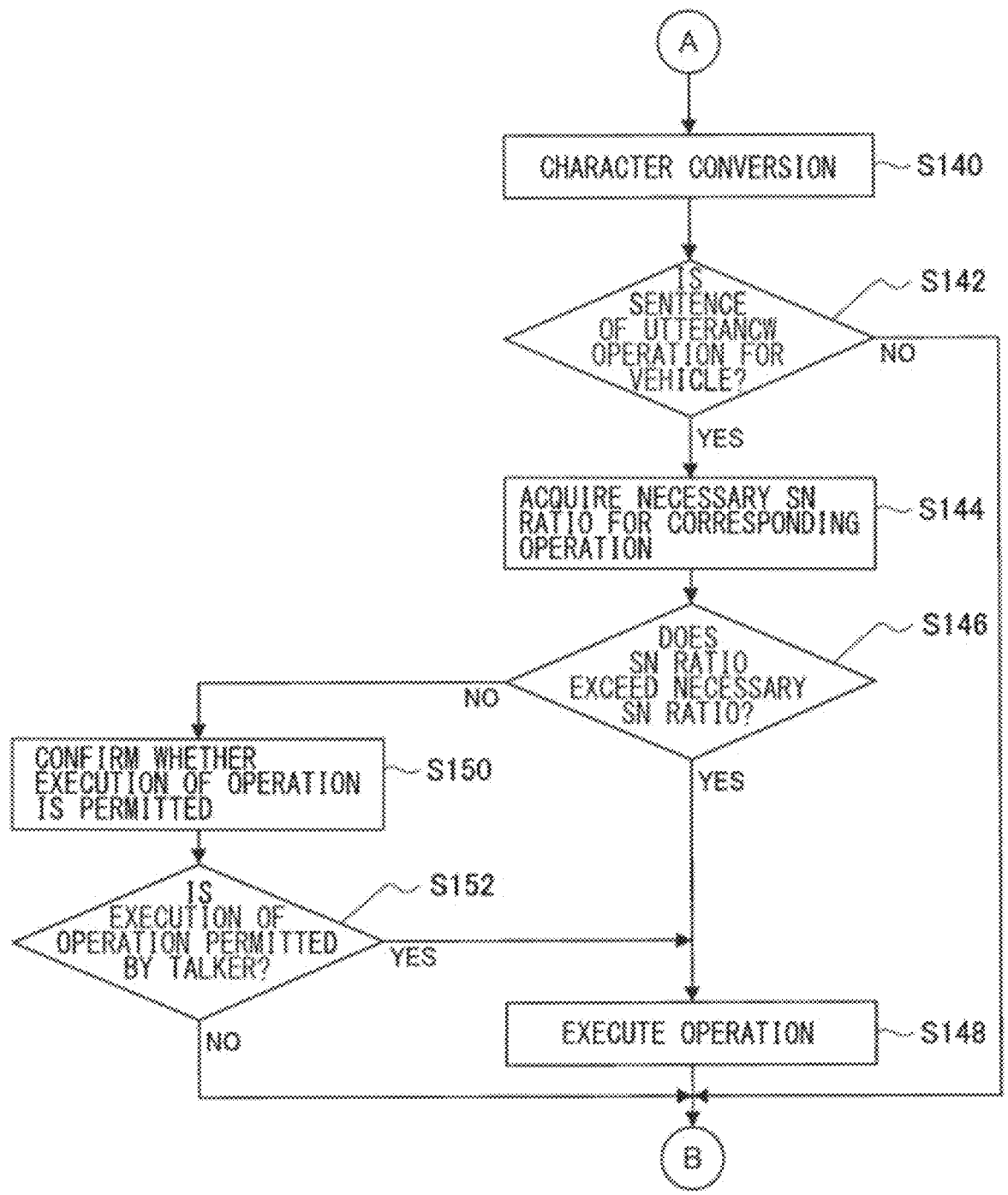
FIG. 13 is a flowchart illustrating an example of the other process executed by the system illustrated in FIG. 9.

Further, FIG. 12 and FIG. 13 are flowcharts illustrating an example of another process executed by the system illustrated in FIG. 9. First, in Step S110, the noise level calculating unit 104 may calculate an average noise level. In Step S112, the noise level calculating unit 104 may calculate a noise level at each frequency. In Step S114, the noise level calculating unit 104 or the voice level calculating unit 106 may determine whether voice is inputted. In a case where it is determined that voice is inputted (YES in Step S114), the processing flow may proceed to Step S118, and the voice level calculating unit 106 may calculate an average voice level. In contrast, in a case where it is determined that voice is not inputted in Step S114 (NO in Step S114), the processing flow may proceed to Step S116, and the voice level display unit 110 may cause the display 300 to display a representative value of a previous voice level on the screen thereof. After Step S116, the processing flow may return to Step S110.

After Step S118, the processing flow may proceed to Step S120. In Step S120, the voice level calculating unit 106 may calculate a voice level at each frequency. In Step S122, the characteristic frequency calculating unit 126 calculates at least one characteristic frequency of a talker. For example, it is possible to set the highest frequency of the voice level as the characteristic frequency on the basis of voice levels of the respective frequencies. In Step S126, the SN ratio calculating unit 121 may calculate the SN ratio at the characteristic frequency, and the necessary voice level calculating unit 108 determines the necessary voice level.

In Step S128, the voice level calculating unit 106 may determine whether the inputted voice level is appropriate. In a case where it is determined that the voice level is appropriate ("APPROPRIATE" in Step S128), the processing flow may proceed to Step S130, and the voice level display unit 110 may set a color of a portion of the voice level illustrated in FIG. 2 to green. In contrast, in a case where it is determined that the voice level is short in step S128 ("SHORT" in Step S128), the processing flow may proceed to Step S132, and the voice level display unit 110 may set the color of the portion of the voice level illustrated in FIG. 2 to blue. After any of Steps S130 and S132, the processing flow may proceed to Step S134, and the voice level display unit 110 may cause the display 300 to display the voice level and the necessary voice level on the screen thereof.

Further, after the characteristic frequency is calculated in Step S122, in Step S124, the voice level calculating unit 106 may calculate a representative value of a voice level during an utterance section, and store the calculated representative value of the voice level in an unillustrated storage region.

Further, after the characteristic frequency is calculated in Step S122, in Step S140 of FIG. 13, the character converting unit 118 may execute character conversion from the inputted voice to a character string. In Step S142, the operation estimating unit 120 may determine whether a sentence of the utterance is an operation for a vehicle. In a case where it is determined that the sentence of the utterance is the operation for the vehicle (YES in Step S142), the processing flow may proceed to Step S144. In Step S144, the operation permission determining unit 122 may acquire a necessary SN ratio for the corresponding operation from the necessary SN ratio database 128. SN ratios may be so stored in the necessary SN ratio database 128 as to be associated with respective operations. Therefore, it is possible to acquire the necessary SN ratio in accordance with the corresponding operation. In a case where it is determined that the sentence of the utterance is not an operation for the vehicle in step S142 (NO in Step S142), the processing flow may be terminated.

In Step S146, the operation permission determining unit 122 may determine whether the SN ratio at the characteristic frequency calculated in Step S126 exceeds the necessary SN ratio. In a case where it is determined that the SN ratio exceeds the necessary SN ratio (YES in Step S146), the processing flow may proceed to Step S148. In Step S148, the operation permission determining unit 122 may execute the operation as the operation executing unit.

In contrast, in a case where it is determined that the SN ratio does not exceed the necessary SN ratio (NO in Step S146), the processing flow may proceed to Step S150. In Step S150, an operation confirmation executing unit 111 may present, from the display 300 and a speaker 400, information that the SN ratio does not exceed the necessary SN ratio. The talker may confirm, on the basis of the presented information, whether execution of the operation is permitted. In Step S152, the operation permission determining unit 122 may determine whether the talker carries out permission. In a case where it is determined that permission of the execution of the operation is carried out by the talker (YES in Step S152), the processing flow may proceed to Step S148, and the operation permission determining unit 122 may execute, as the operation executing unit, the operation. In contrast, in a case where it is determined that permission is not carried out by a user as the talker in step S152 (NO in Step S152), the processing flow may be terminated.

Third Example Embodiment

Figure 14:
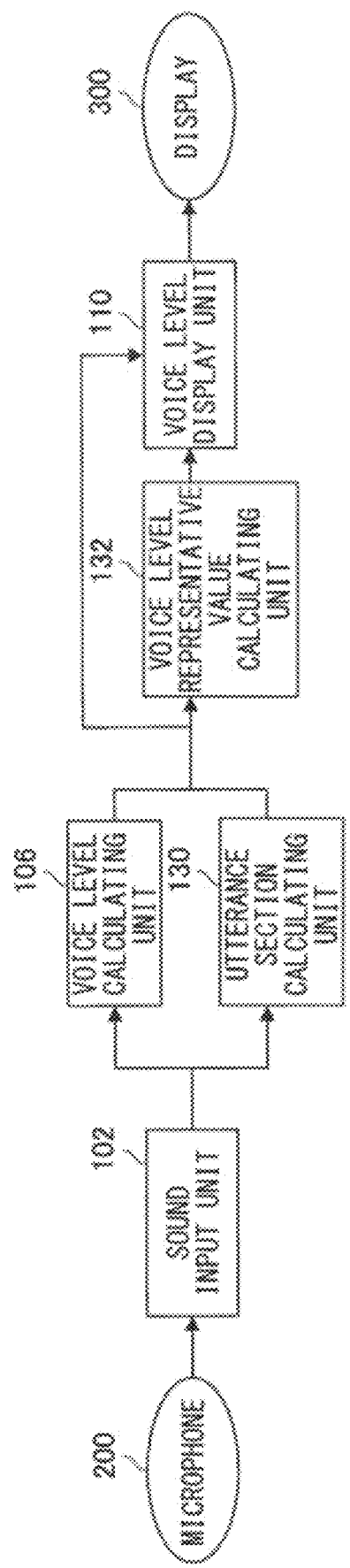
FIG. 14 is a block diagram illustrating an example of a system according to one example embodiment.

FIG. 14 is a block diagram illustrating an example of a system according to a third example embodiment. As illustrated in FIG. 14, voice acquired by the microphone 200 may be inputted to the sound input unit 102. The voice level calculating unit 106 calculates a voice level of the acquired voice. An utterance section calculating unit 130 calculates an utterance section of the acquired voice. The utterance section calculating unit 130 may regard a portion with high voice likelihood as the utterance section. The utterance section can be calculated on the basis of the voice level and a characteristic frequency, for example. A voice level representative value calculating unit 132 calculates a representative value of the voice level within the calculated utterance section. The representative value of the voice level can be calculated by using one or more of the maximum voice level in the utterance section, an average voice level of the utterance section, and a voice level of vowels in the utterance section. The voice level display unit 110 executes a process to cause the display 300 to display the voice level on the screen thereof.

According to the configuration example illustrated in FIG. 14, it is possible to maintain or continue a state where the representative value of the voice level in previous utterance is being displayed until next utterance is started. FIG. 3 according to the first example embodiment is a diagram schematically illustrating an example of a state where display of a representative value of a voice level (a previous speech level in the first example embodiment) is maintained until next utterance is started. By displaying a message "Please increase the volume of voice a little more." together with the representative value of the voice level, it is possible to prompt a talker to speak with louder voice than that of the previous time when utterance is started. For this reason, it becomes possible to cause the talker to carry out utterance with an appropriate voice level.

As described above, some example embodiments of the technology have been described in detail with reference to the accompanying drawings. However, the technology is not limited to the example embodiments described above. It is clear that a person having ordinary knowledge in the technical field to which the technology belongs can arrive at various variations or modifications within the scope of the technical idea described in the following claims. It is of course to be understood that these are also included in the technical scope of the technology.

As explained above, according to the voice recognizing apparatus, the voice recognizing method, and a computer-readable medium of one embodiment of the technology, it is possible to provide a new and improved voice recognizing apparatus capable of recognizing a suitable voice level even under various conditions.

Each of the sound input unit 102, the noise level calculating unit 104, the voice level calculating unit 106, the necessary voice level calculating unit 108, the voice level display unit 110, the operation confirmation executing unit 111, the reliability calculating unit 112, the character converting unit 118, the operation estimating unit 120, the SN ratio calculating unit 121, the operation permission determining unit 122, the characteristic frequency calculating unit 126, the utterance section calculating unit 130, and the voice level representative value calculating unit 132 illustrated in FIGS. 4, 9, and 14 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the above-described units 102 to 132 illustrated in FIGS. 4, 9, and 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the above-described units 102 to 132 illustrated in FIGS. 4, 9, and 14.

Although some example embodiments of the technology have been described in the foregoing by way of example with reference to the accompanying drawings, the technology is by no means limited to the example embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A voice recognizing apparatus, comprising circuitry configured to:
receive an electrical signal as a voice signal and an electrical signal as a noise signal, the electrical signal as the voice signal being converted from voice of a talker, the electrical signal as the noise signal being converted from noise in usage environment;
calculate, as a voice level, a level of the received voice signal of the talker;
calculate, as a noise level, a level of the received noise signal;
perform conversion of a waveform of the electric signal as the voice signal into a character string;
calculate reliability of the conversion when the conversion of the waveform into the character string is performed, wherein calculating the reliability of the conversion includes calculating a basic reliability of a specific talker in a situation where the noise level is low; and
calculate a necessary voice level on a basis of the voice level, the noise level, and the reliability, wherein calculating the necessary voice level includes correcting the necessary voice level on a basis of the basic reliability.

2. The voice recognizing apparatus according to claim 1, wherein the circuitry is configured tocalculate the reliability of every utterance of the talker, and
the circuitry is configured to increase the necessary voice level that is to be used at a next or later time in a case where the reliability of the utterance is low on a basis of a predetermined threshold.

3. The voice recognizing apparatus according to claim 1, wherein
the circuitry is configured to calculate the reliability of every utterance of the talker, and
the circuitry is configured to decrease the necessary voice level that is to be used at a next or later time in a case where the reliability of the utterance is high on a basis of a predetermined threshold.

4. A voice recognizing apparatus according to claim 1, wherein the circuitry is further configured to
calculate at least one characteristic frequency of the talker; and
calculate the necessary voice level on a basis of the voice level at the calculated characteristic frequency and the noise level at the calculated characteristic frequency.

5. The voice recognizing apparatus according to claim 4, wherein the circuitry is further configured to
calculate the at least one basic characteristic frequency of the talker in a situation where the noise level is low,
calculate the voice level at the calculated basic characteristic frequency,
calculate the noise level at the basic characteristic frequency at any time, and
calculate the necessary voice level on a basis of the noise level calculated at any time.

6. The voice recognizing apparatus according to claim 5, further comprising a voice level display device configured to cause a display to display the necessary voice level, wherein
the voice level display device is configured to cause the display to continue to display a representative value of the voice level of previous utterance until next utterance is started.

7. The voice recognizing apparatus according to claim 6, wherein
the circuitry is configured to calculate the voice level representative value by using one or more of a maximum voice level in a utterance section, an average voice level of the utterance section, or a voice level of a vowel in the utterance section.

8. The voice recognizing apparatus according to claim 4, wherein the circuitry is further configured to
calculate the characteristic frequency for every utterance,
calculate the voice level at the calculated characteristic frequency, and
calculate the noise level at the calculated characteristic frequency for every utterance.

9. The voice recognizing apparatus according to claim 4, further comprising a necessary signal-to-noise ratio database configured to hold a signal-to-noise ratio between the voice level and the noise level, the signal-to-noise ratio being required for each operation at the characteristic frequency; wherein
the circuitry is further configured to:
perform conversion of a waveform of the electric signal as the voice signal into a character string;
estimate an operation of the talker from the character string after the conversion;
execute the operation on a basis of the estimated operation; and
compare a signal-to-noise ratio of utterance of the talker with the signal-to-noise ratio at the characteristic frequency stored in the necessary signal-to-noise ratio database,
in a case where the signal-to-noise ratio of the utterance is shorter than the stored signal-to-noise ratio at the characteristic frequency, request the talker to confirm whether the operation is to be executed, and
execute the operation only in a case where the talker permits execution of the operation.

10. The voice recognizing apparatus according to claim 4, further comprising a voice level display device configured to cause a display to display the necessary voice level, wherein
the voice level display device is configured to cause the display to continue to display a representative value of the voice level of previous utterance until next utterance is started.

11. The voice recognizing apparatus according to claim 10, wherein
the circuitry is configured to calculate the voice level representative value by using one or more of a maximum voice level in a utterance section, an average voice level of the utterance section, or a voice level of a vowel in the utterance section.

12. The voice recognizing apparatus according to claim 1, further comprising
a voice level display device configured to cause a display to display a necessary voice level, wherein
the voice level display device is configured to cause the display to continue to display a representative value of the voice level of previous utterance until next utterance is started.

13. The voice recognizing apparatus according to claim 12, wherein
the circuitry is configured to calculate the voice level representative value by using one or more of a maximum voice level in a utterance section, an average voice level of the utterance section, or a voice level of a vowel in the utterance section.

14. A voice recognizing apparatus, comprising
circuitry configured to:
receive an electrical signal as a voice signal and an electrical signal as a noise signal, the electrical signal as the voice signal being converted from voice of a talker, the electrical signal as the noise signal being converted from noise in usage environment;
calculate, as a voice level, a level of the received voice signal of the talker;
calculate, as a noise level, a level of the received noise signal;
perform conversion of a waveform of the electric signal as the voice signal into a character string;
calculate reliability of the conversion when the conversion of the waveform into the character string is performed; and
calculate a necessary voice level on a basis of the voice level, the noise level, and the reliability, and
a necessary reliability database configured to hold necessary reliability that is required for each operation,
wherein the circuitry is configured to:
estimate an operation of the talker from the character string after the conversion; and
execute the operation on a basis of the estimated operation, wherein
the circuitry is configured to compare the reliability with the corresponding necessary reliability stored in the necessary reliability database, and not to execute the estimated operation in a case where the reliability does not exceed the necessary reliability.

15. The voice recognizing apparatus according to claim 14, further comprising a voice level display device configured to cause a display to display the necessary voice level, wherein
the voice level display device is configured to cause the display to continue to display a representative value of the voice level of previous utterance until next utterance is started.

16. The voice recognizing apparatus according to claim 15, wherein
the circuitry is configured to calculate the voice level representative value by using one or more of a maximum voice level in a utterance section, an average voice level of the utterance section, or a voice level of a vowel in the utterance section.

17. A voice recognizing method, comprising:
receiving voice of a talker and noise in usage environment;
performing conversion of the received voice of the talker into an electric signal as a voice signal and conversion of the received noise into an electrical signal as a noise signal;
calculating, as a voice level, a level of the voice signal of the talker;
calculating, as a noise level, a level of the noise signal;
performing conversion of a waveform of the electric signal as the voice signal into a character string;
calculating reliability of the conversion of the waveform into the character string when the conversion of the waveform into the character string is performed, wherein
a basic reliability of a specific talker in a situation where the noise level is low is calculated; and
calculating a necessary voice level on a basis of the voice level, the noise level, and the reliability, wherein
the necessary voice level is corrected on a basis of the basic reliability.

18. A voice recognizing method according to claim 17, further comprising:
calculating at least one characteristic frequency of the talker; and
calculating the necessary voice level on a basis of the voice level at the calculated characteristic frequency and the noise level at the calculated characteristic frequency.

* * * * *